Jan. 17, 1967  H. A. STORCH  3,298,750
FASTENER ASSEMBLY
Filed Aug. 2, 1965  3 Sheets-Sheet 1
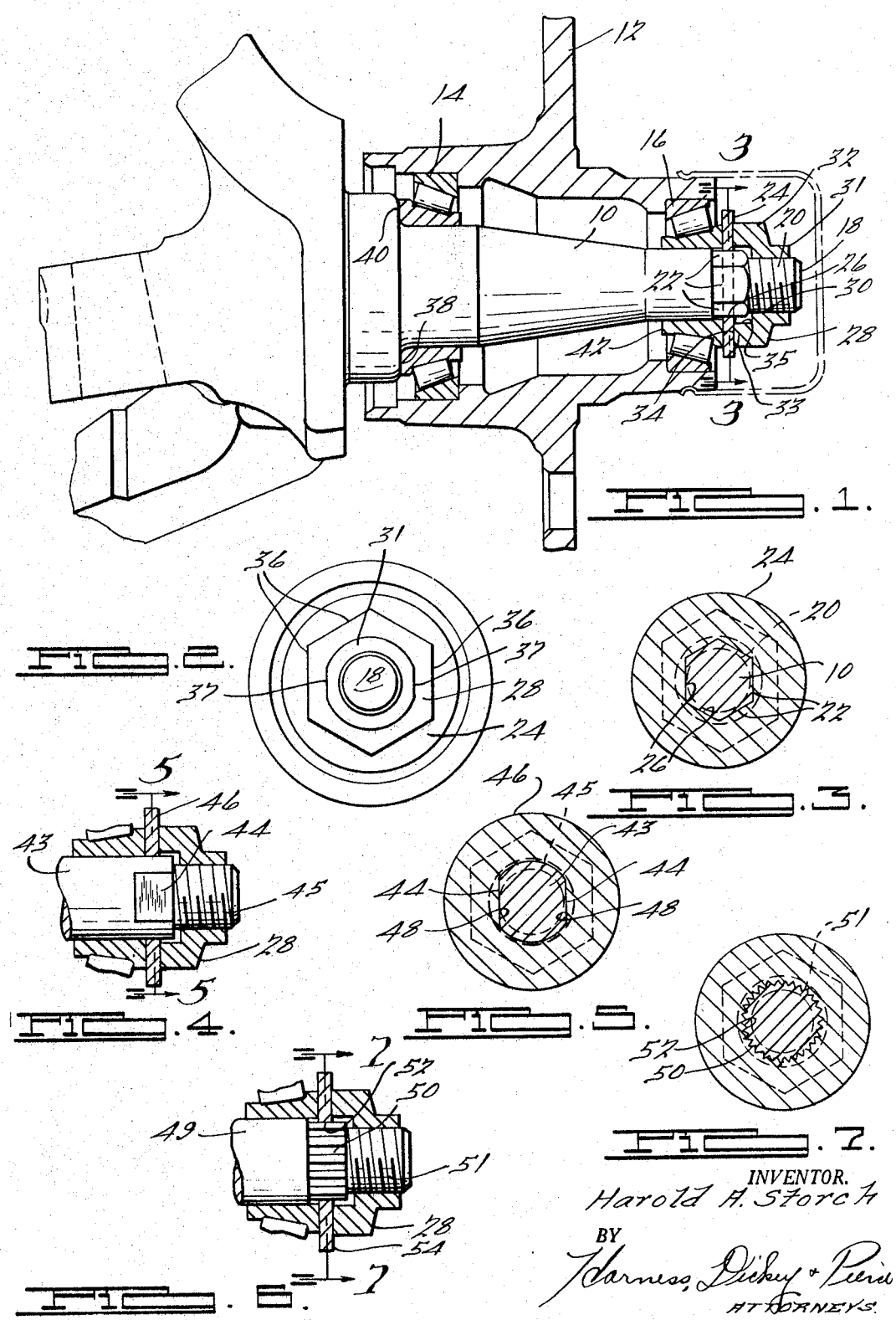
INVENTOR.
Harold A. Storch
BY
Harness, Dickey & Pierce
ATTORNEYS.

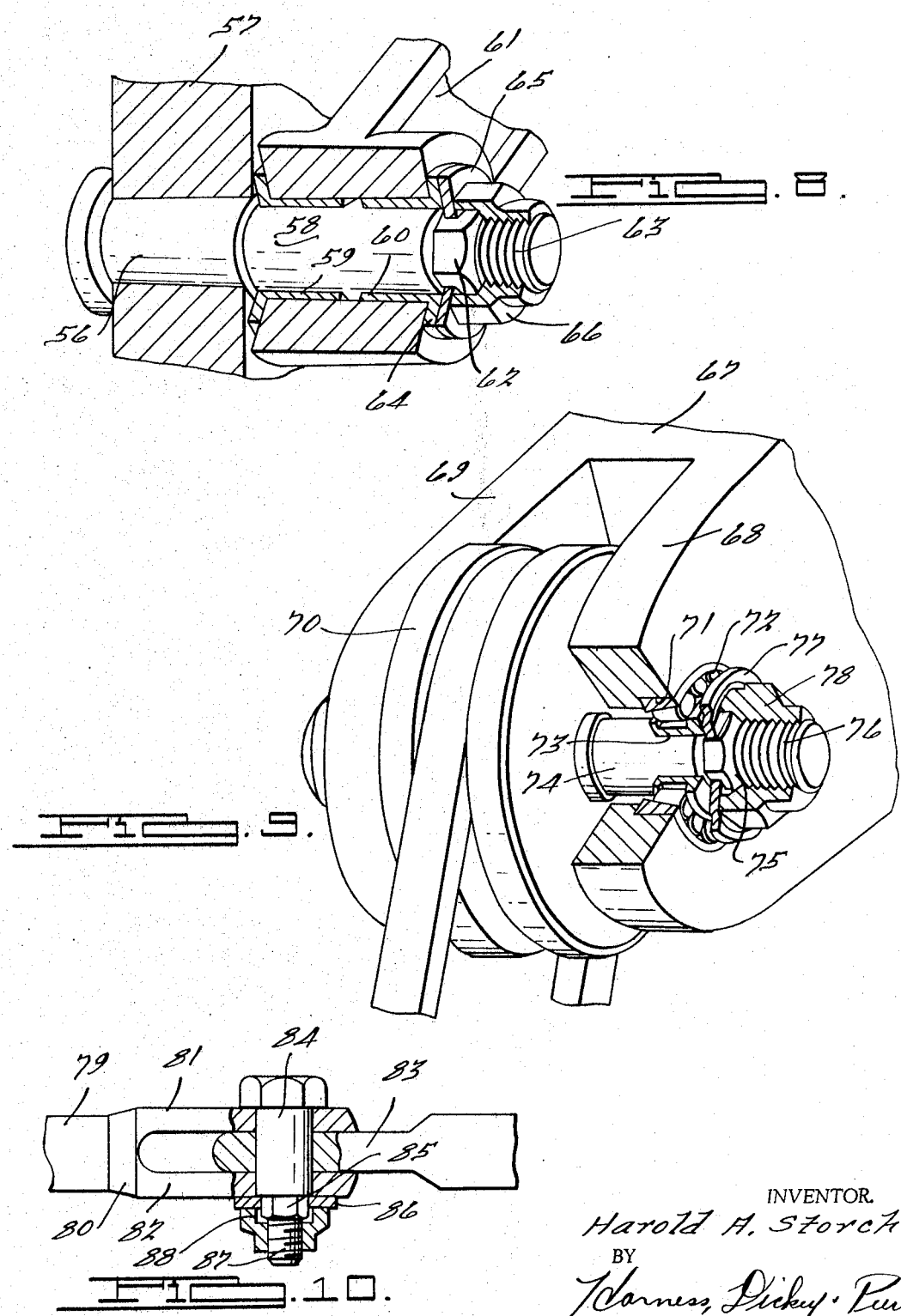

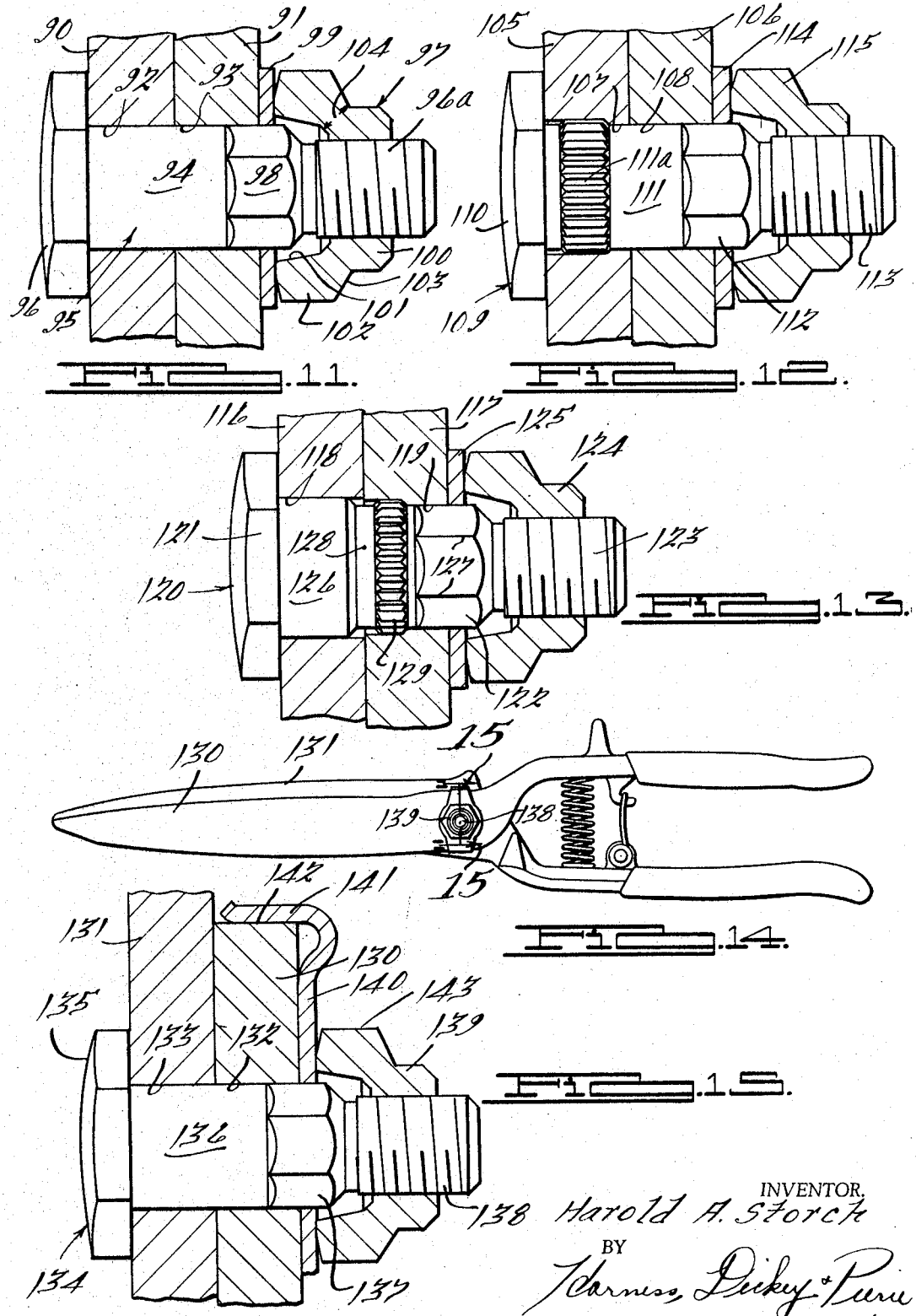

United States Patent Office 3,298,750
Patented Jan. 17, 1967

3,298,750
FASTENER ASSEMBLY
Harold A. Storch, Birmingham, Mich., assignor to Federal Screw Works, Detroit, Mich., a corporation of Michigan
Filed Aug. 2, 1965, Ser. No. 479,037
4 Claims. (Cl. 308—2)

This application is a continuation-in-part of my prior copending application, Ser. No. 204,741, filed June 25, 1962.

This invention relates to fastener assemblies and particularly to a fastener assembly incorporating a stud or the like passing through a pair of members to be joined, a nut threaded on the stud, and an antirotational washer interposed between one of the joined members and the nut for preventing undesired loosening of the nut due to rotation of the stud or the joined members.

The present invention can be used in a wide variety of applications employing threaded fasteners. In some of such applications one member is supported for rotation relative to another member. A typical example of such an assembly comprises a front automobile wheel spindle and the structure supported thereon.

The wheels carried by spindle assemblies normally incorporate a hub portion provided with a pair of antifriction bearings. The inner races of such bearings are adapted to be positioned on the spindle in a manner which permits the hub and the associated structure to be removed with a minimum of difficulty for maintenance purposes. Furthermore, the bearings are not tightly clamped in an axial direction but, rather, the wheel retaining mechanism is positioned to afford the bearings a minor degree of axial clearance to permit their expansion under operating conditions involving increased temperatures. This somewhat loose mounting of the wheel bearings permits the rotation of the inner race of the bearings on the spindle under some operating conditions. It is important that the wheel retaining nut be insulated from any rotational forces developed by the inner race of the adjacent bearing, as such forces would tend either to screw the nut off the spindle or excessively tighten the nut, depending upon the direction of rotation of the wheel. Should the nut become unscrewed from the spindle, the wheel would be lost and, should the nut become excessively tightened on the spindle against the inner race of the outboard bearing, jamming of the bearings with excessive damage thereto might occur.

It is, therefore, common practice to provide an antirotational washer between the nut and the inner race of the outboard bearing, to prevent the rotating inner race of the outboard bearing from exerting rotating forces on the nut. It is noted that, under normal conditions, this inner race might only rotate at a very slow rate and does not develop any substantial amount of torque. However, should the antifriction members between the inner and outer races become heavily frictionally engaged with said races, the torque on the inner race and its ability to rotate the spindle nut would be greatly increased.

There are various other situations when two members are clamped together which do not rotate relative to one another but in which the fastener is subject to vibrations tending to rotate the bolt. In such a situation it is highly desirable to insulate the nut from any forces tending to rotate it off the bolt.

Further, in many angular joints it is desirable to cause the bolt on which the members pivot to rotate with one of the members. By this means it is possible to positively establish the bearing surfaces. In doing so, however, it is necessary to protect the nut from angular forces tending to cause it to come off the bolt.

It is, therefore, an object of the present invention to provide a fastener assembly incorporating an antirotational washer which is effective to insulate the nut threaded on a spindle or the like from the rotational forces of the member supported on the spindle.

It is another object of the present invention to provide a fastener assembly incorporating an antirotational washer in which the male threaded member is fabricated by metal forming and spindle threading operations, without the necessity of supplementary milling, drilling or other machining operations which have heretofore been required to form slots, holes and other shapes in the spindle.

It is still another object of the present invention to provide an assembly of the above character which is highly reliable in operation, which is inexpensive of manufacture, which is conveniently assembled and disassembled and which is of rugged, long-lasting construction.

It is a further object of the present invention to provide an assembly of the above character in which the nut may be rotated to any desired position to establish an accurate clearance between the washer and an adjacent wheel bearing or other member supported on the male threaded member to establish a given torque loading without the necessity of relocating the nut to align it with a cotter keyhole or locking tab on the washer.

It is still another object of the present invention to provide an assembly of the above character which eliminates the necessity of using the cotter key or other part that must be bent with the nut in specific angular position.

It is a further object of the present invention to provide a nut adapted for use in an assembly of the above character which is adapted to lock itself in any selected angular position on the spindle, which is capable of accurately positioning the antirotational washer in its intended location, which may be conveniently applied to the male threaded member and which possesses an effective, long-lasting locking action.

It is another object of the present invention to provide a fastener assembly of the above character using a nut which is subject to deflection when loaded to help maintain tightness of fit between the parts despite slight wear of the parts.

It is another object of the present invention to provide a fastener assembly of the above character which provides a smooth flat seat for the nut, which is stable, and which exerts low bearing pressures on the parts fastened.

These and other objects of the present invention will become apparent from the following detailed description taken in conjunction with the accompanying drawings wherein:

FIGURE 1 is a longitudinal sectional view of a vehicle wheel hub and spindle assembly with parts in elevation;

FIG. 2 is a right-hand end view of FIG. 1;

FIG. 3 is a cross-sectional view of FIG. 1 taken along the line 3—3 thereof;

FIG. 4 is a modified form of a portion of the spindle and fastening means of FIG. 1;

FIG. 5 is a cross-sectional view of FIG. 4 taken along the line 5—5 thereof;

FIG. 6 is another modified form of the spindle and fastening means of FIG. 1;

FIG. 7 is a cross-sectional view of FIG. 6 taken along the line 7—7 thereof;

FIG. 8 is a perspective view, with parts broken away, of structure illustrating another form of the invention, said structure utilizing the nut of FIG. 1;

FIG. 9 is a perspective view, with parts broken away, of structure illustrating still another form of the invention, said structure utilizing the nut of FIG. 1;

FIG. 10 is a plan view, with parts broken away, of structure illustrating still another form of the invention, said structure utilizing the nut of FIG. 1;

FIG. 11 is a sectional view of structure illustrating another form of the present invention;

FIG. 12 is a view of structure similarly illustrated in FIG. 11 showing another form of the present invention;

FIG. 13 is a view of structure similarly illustrated in FIG. 12 showing still another form of the present invention;

FIG. 14 is a plan view of a pair of grass shears incorporating a fastener assembly according to the present invention; and FIG. 15 is an enlarged sectional view of structure illustrated in FIG. 14 taken along the line 15—15 thereof.

Referring to FIGS. 1–3 of the drawings, a spindle 10 rotatably carries a wheel hub 12 by means of inboard and outboard tapered roller bearings 14 and 16, respectively. Other types of bearings, such as nontapered roller or ball bearings, may, of course, be substituted for the bearings illustrated. The outer end 18 of the spindle is provided with threads 20 on its outer surface which terminate at a portion of hexagonal cross section defined by a plurality of keying shoulders 22, formed preferably by forging in the outer surface of the spindle. These shoulders are positioned radially outwardly of the threads 20 for a purpose hereinafter described.

A nonrotatable washer 24 is formed with a central noncircular aperture defined by a plurality of shoulders 26 complementary to shoulders 22 and is slidably received thereon to prevent relative rotation between the washer and spindle while allowing relative axial motion therebetween. A nut 28 is threaded onto the threads 20 of the spindle portion 18 and serves to position the washer 24 against the inner race of the bearing 16. The nut is formed with a threaded bore 30, a reduced diameter portion or collar 31 at one end of the threaded bore and an enlarged diameter portion 32 adjacent the other end of the threaded bore 30. An annular flange or shoulder portion 33 extends axially from the enlarged diameter nut portion 32 and is provided with a shoulder 34 at its end engageable with the washer 24. The shoulder portion 33 has an inner diameter 35 which is spaced radially outwardly from the cylinder on which the threaded bore 30 lies and the cavity defined by the inner diameter 35 receives the spindle shoulders 22 in the final nut position. The small diameter nut portion 31 is initially formed in a cylindrical outer shape but is subjected to a deforming operation which provides a pair of indentations 37 on opposite sides thereof. The formation of the indentations is effective to displace the metal defining the portion of the bore 30 radially opposite the indentations 37, whereby said deformed bore portion will frictionally bind against the threads 20 of the spindle portion 18. The binding force is not so great as to prevent rotation of the nut completely onto the spindle but is sufficient to prevent undesired or inadvertent loosening of the nut as a result of normal vibration, shocks or other forces to which the nut is subjected during operation of the vehicle. It is to be noted that the greater thickness of the metal at the enlarged nut portion 32 permits localization of the distortion at the outboard end of the nut. This assures that the threads of the bore located within the nut portion 32 will be undistorted to provide suitable starting threads for the convenient application of the nut to the spindle. Both the enlarged nut portion 32 and the flange 33 have an outer periphery of uniform cross section, which is polygonally shaped to provide suitable wrench receiving flats 36 by means of which the nut may be tightened onto the spindle or removed therefrom.

In making the assembly shown in FIGS. 1–3, the wheel hub 12 along with the bearings 14 and 16 are relatively loosely slid over the spindle until a shoulder 38 on the spindle engages a shoulder 40 on the race of the inner bearing. With the wheel and bearings in their proper positions as shown in FIG. 1, the washer 24 is then slid over the shoulders 22 and the nut 28 is threaded onto and tightened on the threaded end of the spindle. Suitable gauging means may be employed to achieve the proper spacing between washer 24 and the inner race 42 of the outboard bearing 16. This spacing is necessary, as explained above, to take up the heat expansion of the bearings and prevent jamming of the rollers between the races. The nonrotation of washer 24 during the operation of the vehicle prevents rotation of the inner race 42 of the outboard bearing 16 from exerting a rotative force on the nut 28. As also mentioned above, the inner races of the bearings 14 and 16 are usually not heavily frictionally engaged with the spindle 10 so that the bearings and the hub 12 may be readily removed for maintenance purposes.

Referring to the modified structure of FIGS. 4 and 5, a spindle 43 is illustrated, which has a pair of diametrically opposite keying shoulders 44 formed on an otherwise cylindrical portion of the spindle intermediate the outboard bearing receiving portion thereof and a threaded extremity 45. The washer 46 in FIGS. 4 and 5 is likewise provided with a pair of flat shoulders 48 which mate with shoulders 44 on the spindle and serve the same purpose as the shoulders 26 of the washer in FIGS. 1–3. The same nut 28 used in the construction of FIGS. 1–3 is employed to hold the washer 46 in place on the spindle 43 and the method of assembly of the parts is also the same.

The modified structure of FIGS. 6 and 7 utilizes a spindle 49 having a splined portion 50 formed adjacent to and axially inwardly of a threaded spindle extremity 51. The splined portion 50 serves to nonrotatably receive the conformably splined aperture 52 of a washer 54. The assembly of this structure is the same as for the other forms.

FIG. 8 illustrates the use of a nut and washer of the general type shown in FIG. 1 as applied to a somewhat modified structure. In FIG. 8, a pivot pin or stud 56 is supported at one end thereof in a support or block member 57 and is provided with a cylindrical portion 58 projecting from the member 57. A pair of sleeve bearings 59 and 60 are interposed between the stud portion 58 and the bore of a pivotal arm or link 61. The stud 56 has a shoulder portion 62 extending beyond one side of the arm 61 and disposed between the cylindrical stud portion 58 and a threaded extremity 63 of the stud 56. The sleeve bearing 60 has a radially outwardly extending annular flange 64 engageable with one side of the arm 61. A washer 65 having a noncircular opening is fitted over the shoulder portion 62 to bear against the flange 64, while a nut 66 is threaded onto the threaded stud extremity 63 to clamp the washer 65 against the bearing flange 64. Both the shoulder portion 62 and the opening of the washer 65 are illustrated as being of hexagonal cross section and are adapted to complementarily interengage for preventing rotation of the washer 65 relative to the shoulder portion 62. The configuration and shape of the nut 66 is in all respects identical to the nut 28 of FIG. 1 and its relationship with the washer 65 and shoulder portion 62 is the same as the relationship of the nut 28 to the washer 24 and shoulder portion 22. It will, therefore, be apparent that the nut 66 is effective to retain the bearings 59 and 60 and the arm 61 in assembly on the stud 56 while the washer 65 insulates the nut 66 from any forces or movements resulting from the oscillation or rotation of the arm 61, which would tend to unthread the nut 66 from the threaded stud extremity 63.

In FIG. 9 a still further application of the nut and washer is shown. In this structure, a pulley bracket 67 having spaced arms 68 and 69 is adapted to support a pulley 70 for rotation. For this purpose, the arms 68 and 69 are provided with aligned bearing receiving openings 71 receiving antifriction bearings 72 having inner races 73 engageable with a shaft 74. The shaft 74 has a shoulder portion 75 and a threaded extremity 76. An antirotational washer 77 having a noncircular opening therein is conformably fitted over the shoulder portion 75 to bear against the adjacent inner race 73 at one end thereof. Both the shoulder portion 75 and the opening of its washer 77 are of hexagonal cross section. A nut 78 is threaded onto the threaded extremity 76 to hold the washer 77 against the adjacent inner race 73 and maintain the bearing and parts in assembly. The shaft 74 is keyed to the pulley for corotation therewith and the inner race 73 of each bearing thus rotates with the shaft 74, as do the nut 78 and the washer 77. However, the washer 77 is effective to prevent relative rotation between the nut 78 and the shaft 74 as a result of any tendency of the inner race 73 to rotate with respect to the shaft 74. The nut 78 is also similar to the nut 28 of FIG. 1 and has a relationship to the washer 77 and shoulder portion 75 identical to the relationship of the nut 28 to the washer 24 and shoulder portion 22 of FIG. 1.

Another form of the invention is illustrated in FIG. 10 in which an arm 79 is provided with a clevis portion 80 having apertured arms 81 and 82. An apertured lever 83 is received between the arms 81 and 82 for the passage of a bolt 84 through the apertures of said elements. The bolt 84 has a shoulder portion 85 of hexagonal cross section which receives an antirotational washer 86 bearing against the outer side of the arm 82. The extremity of the bolt is threaded as indicated at 87 for the reception of a nut 88. The opening of the washer 86 is complementarily shaped with respect to the bolt shoulder portion, whereby rotation of the washer 86 relative to the bolt 84 is prevented. The nut 88 is thus insulated from any forces exerted by the rotation of the arm 79 relative to the bolt 84 which would tend to unthread the nut 88 from the threaded extremity 87 of the bolt.

FIG. 11 illustrates another form of the invention in which a pair of members 90 and 91 are clamped together under a load. The members 90 and 91 will be seen to have aligned identically sized openings 92 and 93, respectively, through which passes the cylindrical shaft portion 94 of a bolt 95. The bolt 95 has a head 96 bearing against the member 90 and a threaded reduced diameter terminus 96a on which is threaded a nut 97. The bolt 95 is formed with a shouldered portion 98 between the shaft portion 94 and the threaded terminus 96. The shouldered portion 98 is of noncircular cross section and is adapted to receive thereon a conformably fitting antirotational washer 99 which bears against one side of the member 91.

Referring particularly to the nut 97, it will be seen that the nut 97 has a collar portion 100 at one end thereof which is radially inwardly deformed so that a portion of the threads of the nut 97 will bind against the threads of the terminus 96a at the right-hand end of the nut 97. In addition, the nut 97 is formed with a counterbore 101 at its left-hand end, the wall of which tapers radially inwardly. The portion 102 of the nut surrounding the counterbore 100 is of externally hexagonal shaped configuration for the purpose of receiving a standard wrench, and this portion is of substantially enlarged diameter compared to the collar 100. A sloping conical surface 103 extends between the collar 100 and the portion 102 on the outer peirphery of the nut. It will be seen that the counter bore 101 is of sufficient axial depth so that the nut is left with a dimension, a thickness indicated at 104, reduced with respect to the wall thickness of the portion 102 of the nut. By this means the nut will deflect in the area 104 when it is tightened against the washer 99. This deflection of the nut combines with a slight elongation of the bolt under tension to help securely clamp the parts and maintain the parts in tight fitting relation despite slight wear thereof. Should members 90 and 91 be subject to substantial vibrations, it is possible that the bolt 95 will tend to rotate within the openings 92 and 93. If the bolt 95 should rotate, it will carry the washer 99 in rotation with it and thus the nut 97 will not be subjected to relative angular forces tending to thread it off the bolt, as would be the case if the nut bore directly against the member 91.

FIG. 12 illustrates another form of the invention in which a pair of members 105 and 106 having aligned openings 107 and 108, respectively, are connected by a bolt 109 for pivotal movement of the axis of the bolt 109. The bolt 109 has a head 110 bearing against the member 105, a shank portion 111 passing through the members 105 and 106, a shoulder portion of noncircular cross section 112 disposed at one end of the shank portion 111 and a threaded terminus 113. An antirotational lock washer 114 is fitted on the shoulder portion 112 and a collared lock nut 115 is threaded onto the terminus 113. The embodiment of the invention illustrated in FIG. 12 is distinguished from the foregoing embodiments by the provision of splines 111a which are formed on the shank portion 111 of the bolt 109. The splines 116 dig into the material of the member 105 around the wall of the opening 107 thereof when the bolt is driven into the member 105, and prevent rotation of the bolt 109 with respect to the member 105. By this means it can be established which parts of the joint will rotate with respect to the other parts. By knowing the locations at which wear will tend to occur the parts may be designed to minimize this wear. The member 106 will pivot on the bolt 109 when it rotates with respect to the member 105. However, the rotation of the member 106 will not tend to rotate the nut 115 off the bolt 109 due to the interposition of the antirotational lock washer 114 therebetween.

FIG. 13 illustrates still another form of the present invention in which a pair of relatively angularly movable members 116 and 117 are provided with aligned openings 118 and 119. The opening 118 is slightly larger than the opening 119. A bolt 120 passes through the openings 118 and 119 and is provided with a head 121 bearing against the member 116. The bolt 120 also has a shouldered portion 122 of noncircular cross section located adjacent a threaded bolt terminus 123. A collared lock nut 124 is threaded onto the terminus 123 and bears against an antirotational washer 125 conformably fitted on the bolt portion 122 and bearing against the member 117.

The bolt 120 is provided with a first shank portion 126 conformably fitted within the opening 118. The shoulder portion 122 which is of hexagonal cross section, has a plurality of axial edges 127 engaging the wall of the opening 119 to support the member 117 on the bolt. Located between the shank portion 126 and the shoulder portion 122 is a reduced diameter shank portion 128 provided with raised splines 129 which dig into the material of the member 117 to prevent rotation of the bolt 120 with respect to member 117. It will be noted that the opening 118 is sufficiently large so that the splines may pass through it in order to enter the opening 119 when the bolt 120 is driven into members 116 and 117. In this embodiment of the invention the member 116 is designed to rotate relative to the bolt 120 whereas the member 117 is prevented from rotating with respect to the bolt 120. Accordingly, the shank portion 126 forms a bearing for the member 116 which rotates on it.

FIGS. 14 and 15 illustrate still another form of the present invention in which means are provided for positively preventing rotation of a bolt with respect to one of a pair of pivotally connected members. In this form of the invention the pivotally joined members comprise a pair of blades 130 and 131 of the pair of grass shears.. The blades 130 and 131 have aligned openings 132 and 133, respectively, through which a bolt 134 passes. The bolt 134 has a head 135 bearing against the blade 131 and a shank portion 136 passing through the openings 132 and 133 and forming a journal on which the blade 131 may rotate. The shank portion 136 also has a shoulder portion 137 of hexagonal cross section and a threaded terminus 138. A collared lock nut 139 is threaded onto the terminus 138 and bears against an antirotational washer 140 conformably fitted over the shoulder portion 137. The washer 140 is provided with a pair of performed legs 141 which are disposed at a right angle to main portion of the washer 140 and engage side walls 142 of the blade 130. This prevents rotation of the washer 140 with respect to the blade 130. By virtue of the nonrotational fit between the washer 140 and the bolt 134, the bolt 134 is also prevented from turning with respect to the blade 130. This further aids in insulating the nut 139 from any angular forces which might tend to rotate it off the threaded terminus 138. It also establishes that the blade 131 will rotate with respect to the bolt 134 and the location of any possible wear surfaces may be established so that such surfaces may be finished, lubricated, or otherwise properly treated.

The nut 139 has a wrench-receiving outer peripheral portion 143 of hexagonal cross section and the nut 139 may be rotated to any desired angular position in order to establish the desired tightness of the joint. It will be noted that the nut 139 does not have to be left at any particular angular position to achieve the desired antirotational result.

It will be apparent that the assembly of the present invention incorporates a part which may be variously called a spindle, a shaft, a bolt, a stud, a pivot pin, or a shank, in accordance with its particular environment. Accordingly, the terms "spindle" and "shaft," as used in the claims, are intended to denote any one of said parts.

While it will be apparent that the embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A fastener assembly including a stud having a male threaded portion at one end thereof and a portion of noncircular cross section disposed adjacent said male threaded portion and having a minimum diameter at least as great as the crest diameter of said male threaded portion, a washer nonrotatably positioned on said stud portion of noncircular cross section and slidable axially thereon, and a nut having a threaded bore, a wall surrounding said threaded bore, a seat at one end of said bore, a counterbore extending axially from said seat, a radially deformed collar of reduced outer diameter at the end of said nut opposite from said seat and a deflectable wall portion between said counterbore and said collar of reduced axial thickness.

2. A fastener assembly including a stud having a male threaded portion at one end thereof and a portion of noncircular cross section disposed adjacent said male threaded portion and having a minimum diameter at least as great as the crest diameter of said male threaded portion, a washer nonrotatably positioned on said stud portion of noncircular cross section and slidable axially thereon, a nut having a threaded bore threaded on said stud male threaded portion, a seat at one end of said bore engageable with said washer, a counterbore extending inwardly from said seat and of a size sufficient to receive said stud portion of noncircular cross section a collar of reduced outer diameter at the end of said bore opposite from said seat, said collar being radially inwardly deformed to provide a displaced nut thread area operable to frictionally grip said stud male threaded portion and a wall portion of said nut between said collar and said counterbore of greater radial thickness than the wall portion of said nut adjacent said counterbore and collar and provided with substantially undeformed threads.

3. A fastener assembly including a stud having a male threaded portion at one end thereof and a portion of noncircular cross section disposed adjacent said male threaded portion and having a minimum diameter at least as great as the crest diameter of said male threaded portion, a washer nonrotatably positioned on said stud portion of noncircular cross section and slidable axially thereon, and a nut having a threaded bore, wrench receiving flats on the outer periphery thereof surrounding said bore, a seat at one end of said bore engageable with said washer, a collar of reduced outer diameter at the opposite end of said bore from said seat, said collar being radially deformed to provide a displaced thread area operable to frictionally grip said stud male threaded portion, a counterbore extending inwardly from said seat operable to receive said stud portion of noncircular cross section, and a wall portion of reduced axial thickness disposed between said collar and said wrench receiving flats and between said counterbore and said collar, said wall portion being of greater radial thickness than the portions of the wall of the nut at either said counterbore or said collar whereby said wall portion will resist deformation of the threads thereof during deformation of said collar, but will deflect under axial loading of the nut.

4. An assembly including a pair of members; a stud pivotally connecting said members, said stud having a male threaded portion at one end thereof and a portion of noncircular cross section possessing a minimum diameter at least as great as the crest diameter of said male threaded portion; a washer nonrotatably mounted on said stud portion of noncircular cross section, said washer having a planar portion disposed perpendicular to the axis of said threads and a portion disposed at right angles to said planar portion and engageable with one of said members to prevent rotation of said washer with respect to said one member; a nut having a threaded bore threaded on said stud threaded portion, a seat at one end thereof engageable with said washer, a distorted thread area operable to frictionally grip said stud male threaded portion, and a counterbore extending inwardly from said seat and of a size sufficient to receive said stud portion of noncircular cross section; and means for prevention rotation of said washer and said stud relative to one of said members.

References Cited by the Examiner

UNITED STATES PATENTS

| | | | |
|---|---|---|---|
| 824,382 | 6/1906 | Quitman | 151—38 |
| 858,191 | 6/1907 | Logan | 151—3 |
| 914,132 | 3/1909 | Frisbee | 151—3 |
| 2,464,728 | 3/1949 | Stover | 10—86 |
| 2,915,934 | 12/1959 | Torre | 151—38 |

MARTIN P. SCHWADRON, *Primary Examiner.*

FRANK SUSKO, *Examiner.*